United States Patent
Hong et al.

(10) Patent No.: US 7,620,098 B2
(45) Date of Patent: Nov. 17, 2009

(54) ENHANCED METHOD FOR DEMODULATING CONSTANT-AMPLITUDE MULTI-CODE BIORTHOGONAL MODULATION SIGNALS

(75) Inventors: Een Kee Hong, Seongnam (KR); Jin Woong Cho, Yongin (KR); Sung Jin Kang, Seongnam (KR); Dae Ki Hong, Yongin (KR); Yong Seong Kim, Seongnam (KR); Min Chul Ju, Seongnam (KR); Sung Pil Kim, Yongin (KR); Myoung Jin Kim, Seoul (KR)

(73) Assignee: Korea Electronics Technology Institute, Pyungtaek-si (KR)

(*) Notice: Subject to any disclaimer, the term of this patent is extended or adjusted under 35 U.S.C. 154(b) by 759 days.

(21) Appl. No.: 10/995,096

(22) Filed: Nov. 24, 2004

(65) Prior Publication Data
US 2006/0062285 A1    Mar. 23, 2006

(30) Foreign Application Priority Data
Sep. 22, 2004    (KR) .............. 10-2004-0075953

(51) Int. Cl.
*H04B 1/69* (2006.01)

(52) U.S. Cl. .................. 375/150; 375/130; 370/209; 370/203

(58) Field of Classification Search .............. 375/150, 375/200, 343; 370/203, 209
See application file for complete search history.

(56) References Cited

U.S. PATENT DOCUMENTS

| | | | |
|---|---|---|---|
| 5,920,237 A | | 7/1999 | Park et al. |
| 5,966,401 A | * | 10/1999 | Kumar ............... 375/150 |
| 6,091,784 A | | 7/2000 | Park et al. |
| 6,212,227 B1 | | 4/2001 | Ko et al. |
| 6,298,099 B1 | | 10/2001 | Resnikoff et al. |
| 2001/0005404 A1 | | 6/2001 | Resnikoff et al. |
| 2002/0075907 A1 | | 6/2002 | Cangiani et al. |

FOREIGN PATENT DOCUMENTS
WO    WO 98/23072 A1    5/1998

* cited by examiner

*Primary Examiner*—Shuwang Liu
*Assistant Examiner*—Eva Y Puente
(74) *Attorney, Agent, or Firm*—Sughrue Mion, PLLC

(57) ABSTRACT

Disclosed is a demodulation method for enhancing decoding performance of information bits in a constant-amplitude multi-code biorthogonal modulation communication system, which performs encoding to cause the level of a transmission symbol to be constant.

1 Claim, 3 Drawing Sheets

FIG. 1 <u>PRIOR ART</u>

ENHANCED METHOD FOR DEMODULATING CONSTANT-AMPLITUDE MULTI-CODE BIORTHOGONAL MODULATION SIGNALS

RELATED APPLICATIONS

The present disclosure relates to subject matter contained in priority Korean Application No. 10-2004-0075953, filed on Sep. 22, 2004, which is herein expressly incorporated by reference in its entirety.

BACKGROUND OF THE INVENTION

1. Field of the Invention

The present invention relates, in general, to the demodulation of constant-amplitude biorthogonal modulation signals and, more particularly, to a demodulation method, which enhances reception performance using the characteristics of the modulation signals.

2. Description of the Related Art

Recently, Spread Spectrum (SS) systems have been used as the physical layers of important wireless Local Area Network/Personal Area Network (LAN/PAN) due to the characteristic thereof of being resistant to interference. For example, Institute of Electrical and Electronics Engineers (IEEE) 802.11 and IEEE 802.11b, which are wireless LAN standards, adopt a Direct Spreading (DS) scheme and a Complement Code Keying (CCK) scheme, respectively. Further, IEEE 802.15.4, which is a wireless PAN standard, uses orthogonal modulation, and Ultra-WideBand (UWB) uses biorthogonal modulation.

In a Code Division Multiple Access (CDMA) scheme used in mobile communication, a Direct Sequence (DS)/CDMA scheme of directly multiplying data by orthogonal codes to achieve a spread spectrum is mainly used. However, such a spread spectrum system is disadvantageous in that a spectrum is wasted due to spreading, so that the system is not suitable for high speed data transmission. Therefore, research on a spread spectrum system for providing high speed transmission has been actively carried out. In the outcome of the research, the most universal scheme for providing high speed transmission is to use a multi-code signal. Multi-code modulation is advantageous in that it can obtain higher spectral efficiency compared to a conventional spread spectrum system, but is disadvantageous in that it requires an expensive power amplifier that provides a wide linearity region so as to amplify a multi-level signal. If the linearity region of the power amplifier cannot cover the output levels of a multi-level signal, the power amplifier may undesirably influence the performance of an entire multi-code system due to the non-linearity of the amplifier. Therefore, in order to use a power amplifier having a narrow linearity region, it is preferable that a multi-code signal have constant-amplitude characteristics.

For schemes of solving various problems occurring when the signal level of a modulation signal increases due to the use of a multi-code signal with the increase of the number of transmission data channels in this way, a Pulse Width (PW)/CDMA scheme (disclosed in Korean Pat. Registration No. 293128), a Multi-Phase (MP)/CDMA scheme (disclosed in Korean Pat. Application No. 10-2001-8033), and a Constant-Amplitude multi-Code Biorthogonal Modulation (hereinafter refer to as "CACB") scheme designated as a "Code Selection (CS)/CDMA" (disclosed in Korean Pat. Application No. 10-2001-0061738 and Korean Pat. Application No. 10-2002-0020158) have been proposed.

The PW/CDMA scheme is a method of clipping the levels of an output symbol of a digital adder above a certain value (level limitation), converting only the remaining levels into a pulse width, transmitting the pulse width and causing a signal waveform to consistently have a binary form. An output symbol is converted into a pulse signal having a width determined according to a level by a pulse generator. The PW/CDMA is advantageous in that a modulation signal is converted into a binary form, but is disadvantageous in that, if the number of clipped levels of the modulation signal exceeds 2, the bandwidth of the modulation signal increases in proportion to the number of levels.

The MP/CDMA scheme uses M-ary Phase Shift Keying (MPSK) modulation so as to allow a multi-level signal to be transmitted with a constant amplitude. At this time, the number of levels of the signal is limited to a certain number prior to modulation so as to minimize the influence of channel noise. However, when the level limitation is performed in this way, the orthogonality of a signal is damaged to deteriorate performance. Therefore, this method is problematic in that a code selection algorithm definitely influences a Bit Error Rate (BER), and satisfactory BER performance cannot be obtained in the case where the number of codes to be used increases (that is, in the case where considerably high spectrum efficiency is implemented) due to the interference between multiple codes and loss caused by clipping.

The CACB scheme of the above schemes modulates data by selecting one of the orthogonal codes allocated to blocks using data to be transmitted. Since the number of codes to be stored greatly increases if the number of channels increases, a CACB system is implemented by dividing codes into a plurality of blocks. At this time, since orthogonal codes output from respective blocks are added, a modulation signal also becomes a multi-level signal. The CACB system represents a system, which causes the level of an output symbol to be constant by suitably encoding an input information bit stream so as to solve the problem, so that a level limiter is not necessary.

The above CACB technology is described in brief with reference to the attached drawings.

FIG. 1 illustrates the construction of a transmitter of a CACB system having a constant-amplitude encoder. An encoding method performed by this system includes the steps of converting a serial input information bit stream (user data) composed of N bits into N parallel bits using a Serial/Parallel (S/P) converter 110 and grouping the N parallel bits into three blocks to allow k+1 information channels (FIG. 1 illustrates an example in which k is 2 selected from natural numbers, but the present invention is not limited to this example) to be input to each of three biorthogonal modulation blocks 130_I, 130_J and 130_K, and encoding the information bit stream, input to the three blocks, using a constant-amplitude encoder 120 to generate k+1 encoding output bitstream that are to be input to a fourth block 130_L. As described above, the modulator of the CACB system equipped with the constant-amplitude encoder includes four blocks having the same structure, the four blocks each using a Walsh-Hadamard code as an orthogonal code.

Each of the blocks has k+1 input channels to which information bits having data expressed by 0 and 1 are input. Each of the orthogonal modulators 132_I, 132_J, 132_K and 132_L of the blocks selects one of $2^k$ orthogonal codes on the basis of k pieces of input channel information (that is, k bit data). Each of these orthogonal codes has a length of $2^{k+2}$ chip, and elements of 1 or −1. Each of the multipliers 134_I, 134_J, 134_K and 134_L of the blocks converts "0" of an information bit input through the remaining one channel into "−1" to generate a bipolar signal, multiplies the orthogonal code, selected by a corresponding orthogonal modulator 132_I, 132_J, 132_K and 132_L, by the bipolar signal, and applies the multiplication results to a digital adder 140.

A method of selecting four orthogonal codes from the four blocks may be described by selecting four rows from an M×M Hadamard matrix. Since a code is selected using k bits per block, $2^k$ codes exist in each block. Since a total of 4 blocks exist, the size M of the Hadamard matrix is $M=2^{k+2}$. For example, when a code is selected using two bits in each of the blocks (that is, k=2), the size of the Hadamard matrix is 16×16, and a selected orthogonal code has a length of 16chips.

A method of encoding a bit stream input to three other blocks to generate bits that are to be input to the redundant block 130_L in a CACB system having a constant-amplitude encoder is described. In this case, the number of data bits input to each block is assumed to be k+1. One of $2^k$ orthogonal codes is selected using k bit data of k+1 bits, and the selected orthogonal code is multiplied by the remaining one bit data. If 3×(k+1) information bits input to the three biorthogonal modulation blocks 130_I, 130_J and 130_K are encoded and then input to the redundant block 130_L, the amplitude of an output symbol $S_q$ can be maintained at a constant level when the bits output from the four blocks are added to each other by the digital adder 140.

Referring to FIG. 1, among an input information bit stream composed of 9 bits (N=9), bits used to select codes are ($b_1$, $b_2$), ($b_4$, $b_5$), and ($b_7$, $b_8$), and bits used to determine a sign are $b_0$, $b_3$ and $b_6$. A bits stream used to select a code in the constant-amplitude encoder block 130_L, which is the redundant block, is ($p_1$, $p_2$), and a bit used to determine a sign is $p_0$. If the code selection bits $p_1$ and $p_2$ of the redundant block 130_L and one bit $p_0$ used to determine the sign thereof are encoded as expressed in the following Equation [1], a transmission signal becomes +2 or −2, thus causing the amplitude of the output symbol to be constant.

$$p_0=\overline{b_0 \oplus b_3 \oplus b_6}, p_1=b_1 \oplus b_4 \oplus b_7, p_2=b_2 \oplus b_5 \oplus b_8 \qquad [1]$$

In brief, the CACB system having a constant-amplitude encoder uses Walsh-Hadamard orthogonal codes and includes four blocks. Information bits are transmitted to three blocks among the four blocks, and parity bits formed by encoding the information bits, input to the three blocks, are provided to the remaining one block.

However, a conventional reception or demodulation apparatus demodulates information bits through three blocks except for the redundant block having parity bits. That is, in the conventional reception or demodulation apparatus, the redundant data of one block that are obtained by encoding information bits so as to cause the level of an output symbol of a CACB system comprised of four blocks to be constant and are additionally transmitted are treated as unnecessary data.

SUMMARY OF THE INVENTION

Accordingly, the present invention has been made keeping in mind the above problems occurring in the prior art, and an object of the present invention is to provide a demodulation method and apparatus, which efficiently demodulates a modulation signal in a reception stage of a constant-amplitude multi-code biorthogonal modulation system, and in particular, improves demodulation performance using the characteristics of the modulation signal.

In accordance with a first aspect of the present invention, there is provided a method of demodulating a received signal using an output of correlators and parity check results in a constant-amplitude multi-code biorthogonal modulation system, comprising the steps of a demodulator demodulating the received signal, the demodulator having four blocks; each of the four blocks selecting and combining c ($c \leq 2^k$, k is the number of information bits) bit streams with higher correlation values in descending order among demodulated bit streams to establish $c^4$ bit stream candidates; and performing a parity check with respect to the $c^4$ bit stream candidates, selecting a candidate group having a maximal sum of correlation values among candidate groups in which any error is not generated at the parity check, determining a bit stream corresponding to the selected candidate group to be an output of a receiver, and outputting a bit stream having a maximum correlation value with respect to each of the blocks if there is no candidate group in which any error is not generated.

In accordance with a second aspect of the present invention, there is provided a block sum check method for error correction of a received signal in a constant-amplitude multi-code biorthogonal modulation system, which transmits redundant bits for error correction of information bits subsequent to the transmission of the information bits, comprising the steps of demodulating from the received signal the information bits and parity bits that allocate constant-amplitude characteristics to the received signal to correspond to the information bits; demodulating the redundant bits subsequent to the demodulation of the information bits; and correcting an error in the information bits on the basis of the demodulated parity bits and redundant bits.

In this case, the error correction step may comprise the steps of recalculating redundant bits on the basis of the demodulated information bits and comparing the recalculated redundant bits with the demodulated redundant bits, thus detecting a row having an error in the information bits; recalculating parity bits, allocating constant-amplitude characteristics, on the basis of the demodulated information bits, and comparing the recalculated parity bits with the demodulated parity bits, thus detecting a location of the error in the row having an error; and reversing an information bit at the detected error location.

In accordance with a third aspect of the present invention, there is provided an optimum demodulation method of optimally demodulating a constant amplitude multi-code biorthogonal modulation signal in a constant-amplitude multi-code biorthogonal modulation system that determines orthogonal codes and phases thereof on the basis of sub-sets of N-bit user data and parity bits, which are generated from the user data to allocate constant-amplitude characteristics, and sums the orthogonal codes, determined on the basis of the sub-sets, to generate a modulation signal, comprising the steps of calculating correlation values between $2^N$ pseudo orthogonal codes corresponding to combinations of the N-bit user data and the modulation signal; and selecting a maximum value among the $2^N$ correlation values calculated at the correlation value calculating step, and simultaneously determining N bits corresponding to the modulation signal on the basis of a pseudo orthogonal code corresponding to the maximum value.

In accordance with a fourth aspect of the present invention, there is provided a sub-optimum demodulation method of sub-optimally demodulating a constant-amplitude multi-code biorthogonal modulation signal in a constant-amplitude multi-code biorthogonal modulation system that determines orthogonal codes and phases thereof on the basis of sub-sets of N-bit user data and parity bits, allocating constant-amplitude characteristics, and sums orthogonal codes, determined on the basis of the sub-sets, to generate a modulation signal, comprising the steps of calculating correlation values between $2^{N-1}$ pseudo orthogonal codes, selected on the basis of biorthogonal characteristics of $2^N$ pseudo orthogonal codes corresponding to combinations of the N-bit user data, and the modulation signal; selecting a maximum value among the $2^{N-1}$ correlation values calculated at the correlation value calculating step, and determining N-bit user data corresponding to the modulation signal on the basis of a pseudo orthogonal code corresponding to the maximum value; and inversing bits, which are used to decide phases of the orthogonal codes during the modulation, among the determined N-bit user data, depending on a sign of the selected maximum value.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
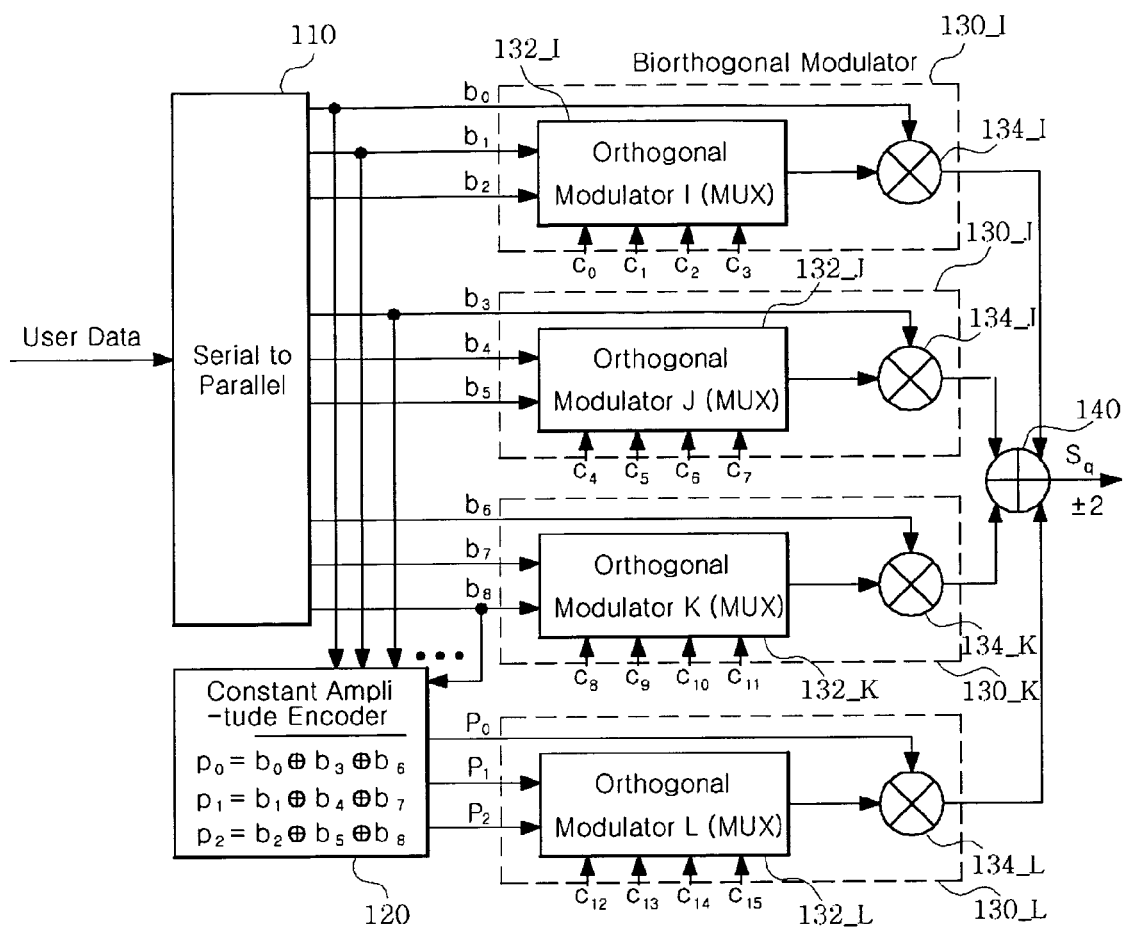
FIG. 1 is a view showing the construction of a constant-amplitude biorthogonal modulation apparatus.

Hereinafter, embodiments of the present invention will be described in detail with reference to the attached drawings.

Reference now should be made to the drawings, in which the same reference numerals are used throughout the different drawings to designate the same or similar components.

Figure 2:
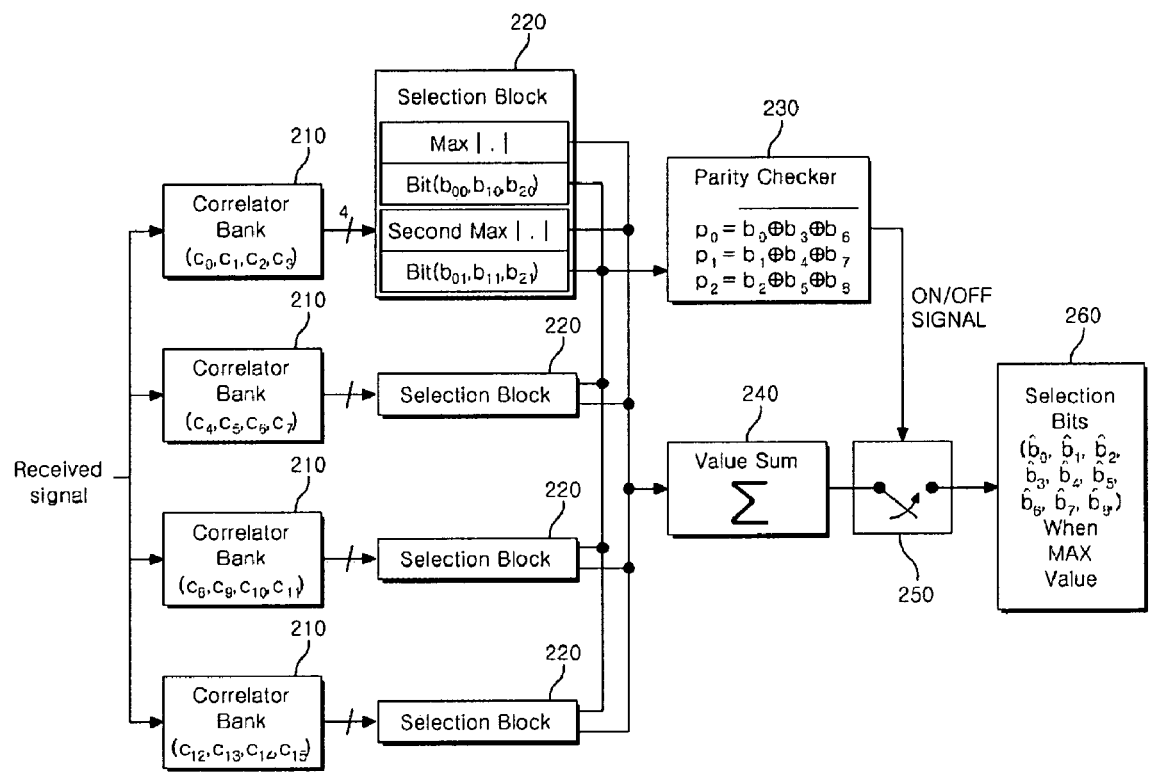
FIG. 2 is a view showing the construction of a reception apparatus, the demodulation performance of which is enhanced using parity bits, according to a first embodiment of the present invention.

FIG. 2 is a view showing the construction of a CACB reception apparatus for demodulating a received signal in a constant-amplitude multi-code biorthogonal modulation system according to a first embodiment of the present invention. The CACB reception apparatus performs an error correction procedure by checking parity bits that are added to and transmitted along with information bits, thus improving the Bit Error Rate (BER) performance of a demodulator.

As described above, redundant data bits used for constant-amplitude encoding are generated as parity bits for information data bits of respective blocks according to Equation [1]. Therefore, if the parity bits of the bit streams output from the modulators of blocks in the reception apparatus are checked, it can be examined whether an error occurs on the location of a specific bit. That is, odd-bit errors for k-th bits among the demodulated bit streams of respective blocks can be detected.

First, each of correlator banks 210 in the CACB demodulator correlates a received signal with an orthogonal code allocated thereto. Each of selection blocks 220 selects higher c correlation values in descending order of absolute values of correlation values (in FIG. 2, c=2) among the correlation values output from each of the correlator banks 210. At this time, the index and sign of the selected codes are determined as a bit stream. However, if an error exists in the results of the parity check conducted on the determined bit stream, the error means that a correlation value with an error code becomes higher than a correlation value with a correct code due to a noise or interference factor. Therefore, in the first embodiment of the present invention, a preset number c of codes with higher correlation values in descending order, including a code having the maximum correlation value, are selected as candidates. And, among the candidates, codes satisfying parity conditions by a parity checker 230 are filtered or chosen by a switch (250) and transmitted to a bit selection unit 260. The transmitted codes are determined to be a finally demodulated bit stream.

In detail, each of the selection blocks 220 sets bit streams corresponding to higher c ($c \leq 2^N$, natural number) correlation values in descending order to the candidates of a transmission bit stream. If the bit streams are combined, $c^4$ hypotheses or candidate groups are established. In order to compare the possibilities of the hypotheses with each other, a parity check is performed with respect to the combination of bit streams corresponding to the $c^4$ hypotheses. Of the hypotheses, a hypothesis having no parity error is selected, and a symbol corresponding to the selected hypothesis is selected as the output of a receiver. Hypotheses satisfying the parity check are two or more, four correlation values from the blocks are summed by a value summing unit 240, and a hypothesis maximizing the sum is selected by a bit selection unit 260. A bit stream corresponding to the selected hypothesis is finally determined to be the output bit stream of the receiver. If there is no hypothesis in which any error is not generated, a bit stream, having a maximum correlation value with respect to each of the blocks, is outputted.

Figure 3:
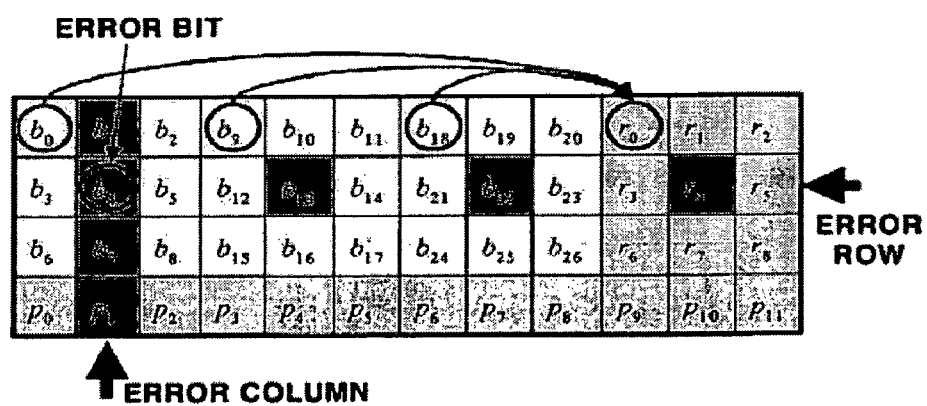
FIG. 3 is a view showing the configuration of information bits and redundant bits used to correct an error bit using a block sum check according to a second embodiment of the present invention.

FIG. 3 is a view showing the configuration of information bits and redundant bits used for a block sum check according to a second embodiment of the present invention.

In a transmission stage, 27 bits of information $b_0$ to $b_{26}$ are grouped into a single block sum check unit, and 9 redundant bits $r_0, r_1, r_2, \ldots, r_8$, are added to the block sum check unit. The redundant bits are calculated by the following Equation [2].

$$r_0 = b_0 \oplus b_9 \oplus b_{18}$$

$$r_1 = b_1 \oplus b_{10} \oplus b_{19}$$

$$r_2 = b_2 \oplus b_{11} \oplus b_{20}$$

·M $$r_8 = b_8 \oplus b_{17} \oplus b_{26} \quad [2]$$

In the second embodiment of the present invention, 9 bits are added to 27 bits, but 9 bits may be added to 9, 18, 27, 36, . . . (9n, n=1, 2, . . . ) bits according to circumstances. The block sum check unit is constructed in the form of a lattice by adding the $p_0, p_1, p_2, \ldots, p_{11}$, calculated in Equation [1] to perform constant-amplitude encoding, to respective columns with respect to 36 bits including the redundant bits. In the block sum check unit, the constant-amplitude biorthogonal modulation is performed with respect to each of three rows using the constant-amplitude biorthogonal modulation apparatus of FIG. 1, so that the linear sums of four biorthogonal codes selected from the columns of each of the three rows are sequentially selected.

In a reception stage, four biorthogonal codes are sequentially detected from respective received signals having lengths corresponding to chip sizes of the orthogonal codes. Further, through the use of the detected biorthogonal codes, information bits $\hat{b}_0, \hat{b}_1, \hat{b}_2, \ldots, \hat{b}_8, \hat{b}_9, \hat{b}_{10}, \hat{b}_{11}, \ldots, \hat{b}_{17}$ and $\hat{b}_{18}$, $\hat{b}_{19}, \hat{b}_{20}, \ldots, \hat{b}_{26}$, the redundant bits $\hat{r}_0, \hat{r}_1, \hat{r}_2, \ldots, \hat{r}_8$, and parity bits $\hat{p}_0, \hat{p}_1, \hat{p}_2, \hat{p}_3, \hat{p}_4, \hat{p}_5, \hat{p}_6, \hat{p}_7, \hat{p}_8$ are detected, respectively. Next, parity bit $\hat{p}_t$ is regenerated at the reception stage as expressed in Equation [1] (for example, $\hat{p}_{i+3k}=\hat{b}_{i+9k}\oplus\hat{b}_{i+1+9k}\oplus\hat{b}_{i+2+9k}$: i and k=0, 1, 2) using the detected information bits. Further, the regenerated parity bit $\hat{p}_i$ is compared to the received parity bit $\hat{p}_i$, and a column having an error is detected if they are not identical to each other. Thereafter, in order to detect a row having an error, redundant bit $\hat{r}_j$ is regenerated at the reception stage as expressed in Equation [2] (for example, $\hat{r}_j=\hat{b}_j\oplus\hat{b}_{j+9}\oplus\hat{b}_{j+18}$; j=0, 1, . . . , 8). The regenerated redundant bit $\hat{r}_j$ is compared to the received redundant bit $\hat{r}_j$. Therefore, if the regenerated redundant bit and the received redundant bit are not identical to each other, a row having an error is detected. As described above, if the locations of the column and row having an error are detected, an error in the information bits transmitted in the form of a lattice can be detected. If the error is detected, the error is corrected using a bit reverse function.

Figure 4:
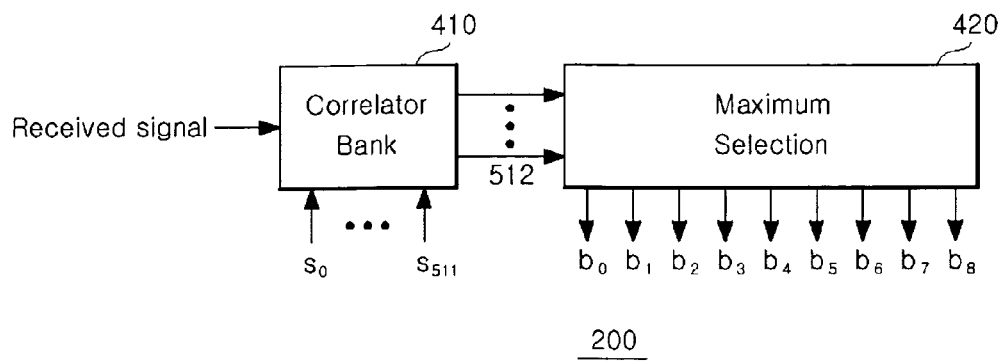
FIG. 4 is a view showing the construction of an optimum demodulation apparatus according to a third embodiment of the present invention.

FIG. 4 is a view showing the construction of a CACB optimum demodulation apparatus according to a third embodiment of the present invention. The optimum demodulation apparatus includes a correlator bank 410 and a maximum value selection block 420. The correlator bank 410 includes 512 correlators that individually output correlation values between a CACB received signal and 512 ($=2^N$) pseudo orthogonal codes (constant-amplitude orthogonal codes corresponding to combinations of 9-bit user data) when the size of user data N is, for example, N=9, as shown in FIG. 1, on the basis of a Maximum Likelihood (ML) algorithm. The maximum value selection block 420 determines an orthogonal code corresponding to the maximum value of the 512 correlation values output from the correlator bank 410, and outputs a user data bit corresponding to the determined orthogonal code.

In the meantime, the binary expression of the indices of the 512 pseudo orthogonal codes can be realized to correspond to the user data bits corresponding to the respective pseudo orthogonal codes. Accordingly, the optimum demodulation apparatus can simultaneously demodulate 9-bit user data at a time by detecting the index of a pseudo orthogonal code having the maximum correlation value with the received signal.

Figure 5:
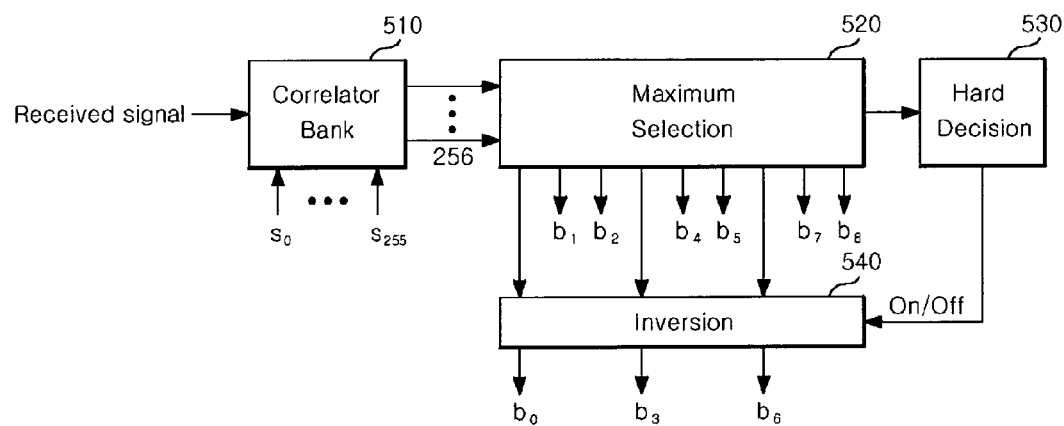
FIG. 5 is a view showing the construction of a sub-optimum demodulation apparatus according to a fourth embodiment of the present invention.

FIG. 5 is a view showing the construction of a CACB sub-optimum demodulation apparatus according to a fourth embodiment of the present invention.

Referring to FIG. 5, the sub-optimum demodulation apparatus includes a correlator bank 510, a maximum value selection block 520, a hard decision unit 530, and an inversion unit 540. The correlator bank 510 includes 256 correlators that individually output correlation values between a received signal and 256 ($=2^{N-1}$) pseudo orthogonal codes when the size of user data N is, for example, N=9 as shown in FIG. 1. The maximum value selection block 520 determines a pseudo orthogonal code corresponding to the maximum value of the 256 correlation values output from the 256 correlators, and outputs a user data bit corresponding to the determined pseudo orthogonal code. The hard decision unit 530 decides whether to reverse the data bits $b_0$, $b_3$, $b_6$ (related to the biorthogonal characteristics of modulation signals) depending on the sign of the maximum value output from the maximum value selection block 520. The inversion unit 540 inverses the phases of the data bits $b_0$, $b_3$, $b_6$ on the basis of the output signal of the hard decision unit 530.

The CACB modulation signal of the present invention has a phase difference of 180 degrees between an odd index code and an even index code of the data bits (for example, $b_0$, $b_3$ and $b_6$ of FIG. 1) allocating biorthogonal characteristics. Therefore, the sub-optimum demodulation apparatus selects 256 pseudo orthogonal codes having odd or even indices, compares correlation values between the pseudo orthogonal codes and the received signal with each other, primarily decides 9 user data bits corresponding to the pseudo orthogonal code with the maximum correlation value, and selectively inverses the phases of the data bits $b_0$, $b_3$, $b_6$, depending on the sign of the maximum correlation value, thus finally determining transmitted user data.

As described above, the present invention provides an enhanced demodulation method and apparatus, which can enhance the reception performance using the characteristics of modulation signals in a constant-amplitude multi-code biorthogonal modulation system.

First, a method and apparatus for demodulating received signals directly using the output of correlators and parity check results according to a first embodiment of the present invention is advantageous in that it utilizes the parity information of a redundant block, which was not used in a conventional receiver, to correct an error in information bits, so that the Bit Error Rate (BER) performance of a system can be improved, and transmission energy required to obtain given quality can be reduced, thus improving energy efficiency.

Second, a block sum check method for error correction according to a second embodiment of the present invention is advantageous in that it configures codes in the form of a lattice using parity bits added to implement constant-amplitude and newly added redundant bits, so that an error in received bits can be detected or corrected, thus improving reception performance.

Third, optimum/sub-optimum reception methods according to third and fourth embodiments of the present invention are advantageous in that, since they use distance characteristics indicating that an antipodal signal is farther than an orthogonal signal, excellent BER performance can be obtained compared to an orthogonal modulation method. In particular, the sub-optimum demodulation method is advantageous in that it can reduce the number of pseudo orthogonal codes required for optimum demodulation using the biorthogonal characteristics of modulation signals, thus implementing hardware at low cost while obtaining demodulation performance equivalent to the optimum demodulation performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed:

1. A method of demodulating a received signal using an output of correlators and parity check results in a constant-amplitude multi-code biorthogonal modulation system, comprising the steps of:

demodulating the received signal in a demodulator, the demodulator having four blocks;

each of the four blocks, selecting and combining c ($c \leq 2^k$, k is the number of information bits) bit streams with higher correlation values in descending order among demodulated bit streams to establish $c^4$ bit stream candidates; and performing a parity check with respect to the $c^4$ bit stream candidates, selecting a candidate group having a maximal sum of correlation values among candidate groups in which any error is not generated at the parity check, determining a bit stream corresponding to the selected candidate group to be an output of a receiver, and outputting a bit stream having a maximum correlation value with respect to each of the blocks if there is no candidate group in which any error is not generated.

* * * * *